(12) United States Patent
Janney

(10) Patent No.: US 6,998,009 B2
(45) Date of Patent: Feb. 14, 2006

(54) FILTER AND METHOD OF FABRICATING

(75) Inventor: Mark A. Janney, Hendersonville, NC (US)

(73) Assignee: UT-Battelle, LLC, Oak Ridge, TN (US)

( * ) Notice: Subject to any disclaimer, the term of this patent is extended or adjusted under 35 U.S.C. 154(b) by 351 days.

(21) Appl. No.: 10/458,126

(22) Filed: Jun. 10, 2003

(65) Prior Publication Data
US 2004/0253371 A1 Dec. 16, 2004

(51) Int. Cl.
*B32B 31/26* (2006.01)
(52) U.S. Cl. .................. 156/283; 427/180; 427/201; 427/203; 264/113
(58) Field of Classification Search ............ None
See application file for complete search history.

(56) References Cited

U.S. PATENT DOCUMENTS

| | | | |
|---|---|---|---|
| 3,390,039 A * | 6/1968 | Caughman et al. ......... 156/166 |
| 3,773,549 A | 11/1973 | Elbert et al. | |
| 4,025,666 A | 5/1977 | Pierce | |
| 4,146,417 A * | 3/1979 | Drelich et al. ............. 156/62.2 |
| 4,738,874 A | 4/1988 | Berardo et al. | |
| 4,888,114 A | 12/1989 | Gaddis et al. | |
| 4,935,139 A | 6/1990 | Davidson et al. | |
| 4,973,435 A | 11/1990 | Jain et al. | |
| 4,983,423 A | 1/1991 | Goldsmith | |
| 5,106,502 A | 4/1992 | Goldsmith | |
| 5,110,470 A | 5/1992 | Yokosawa et al. | |
| 5,307,796 A * | 5/1994 | Kronzer et al. ........ 128/206.16 |
| 5,376,442 A | 12/1994 | Davidson et al. | |
| 5,552,049 A | 9/1996 | Gray | |
| 5,928,721 A * | 7/1999 | Parker et al. ............... 427/197 |
| 6,077,800 A | 6/2000 | Takahashi et al. | |
| 6,097,139 A * | 8/2000 | Tuck et al. .................. 313/310 |
| 6,155,432 A | 12/2000 | Wilson et al. | |
| 6,309,546 B1 | 10/2001 | Herrmann et al. | |
| 6,321,915 B1 | 11/2001 | Wilson et al. | |
| 6,390,304 B1 | 5/2002 | Wilson et al. | |
| 6,402,951 B1 | 6/2002 | Wilson et al. | |

FOREIGN PATENT DOCUMENTS

JP     5-16754 A * 1/1993

* cited by examiner

Primary Examiner—Sam Chuan Yao
(74) Attorney, Agent, or Firm—Joseph A. Marasco

(57) ABSTRACT

A method of making a filter includes the steps of: providing a substrate having a porous surface; applying to the porous surface a coating of dry powder comprising particles to form a filter preform; and heating the filter preform to bind the substrate and the particles together to form a filter.

5 Claims, 4 Drawing Sheets

FILTER AND METHOD OF FABRICATING

The United States Government has rights in this invention pursuant to contract no. DE-AC05-00OR22725 between the United States Department of Energy and UT-Battelle, LLC.

FIELD OF THE INVENTION

The present invention relates to fiber-based filters coated with finely divided powders, and more particularly to such filters fabricated by dry-brushing finely divided powder onto the surface of a fiber support, followed by heating to bind the materials together.

BACKGROUND OF THE INVENTION

Some types of filters are generally fabricated by coating a fibrous substrate with a liquid suspension of particles. The coated substrate is dried and subsequently heated to cause the particles to adhere to the substrate.

U.S. Pat. No. 4,025,666 issued on May 24, 1977 to Pierce, hereinafter referred to as Pierce, the entire disclosure of which is incorporated herein by reference, teaches a method of decorating the border panel or any other area of a fibrous cardboard picture mat. A finely divided pigmented material is brushed into the areas to be colored. The paper surface holds only a limited amount of the dry powder, and excess powder is removed.

OBJECTS OF THE INVENTION

Accordingly, objects of the present invention include the provision of a new method of making inorganic fiber-based filters coated with finely divided inorganic powders, and the provision of filters having mechanical integrity, low pneumatic resistance, and high particle capture efficiency. Further and other objects of the present invention will become apparent from the description contained herein.

SUMMARY OF THE INVENTION

In accordance with one aspect of the present invention, the foregoing and other objects are achieved by a method of making a filter. The method includes the steps of: providing a fibrous substrate having a porous surface; applying to the porous surface a coating of dry powder comprising particles to form a filter preform; and heating the filter preform to bind the substrate and the particles together to form a filter.

Figure 1:
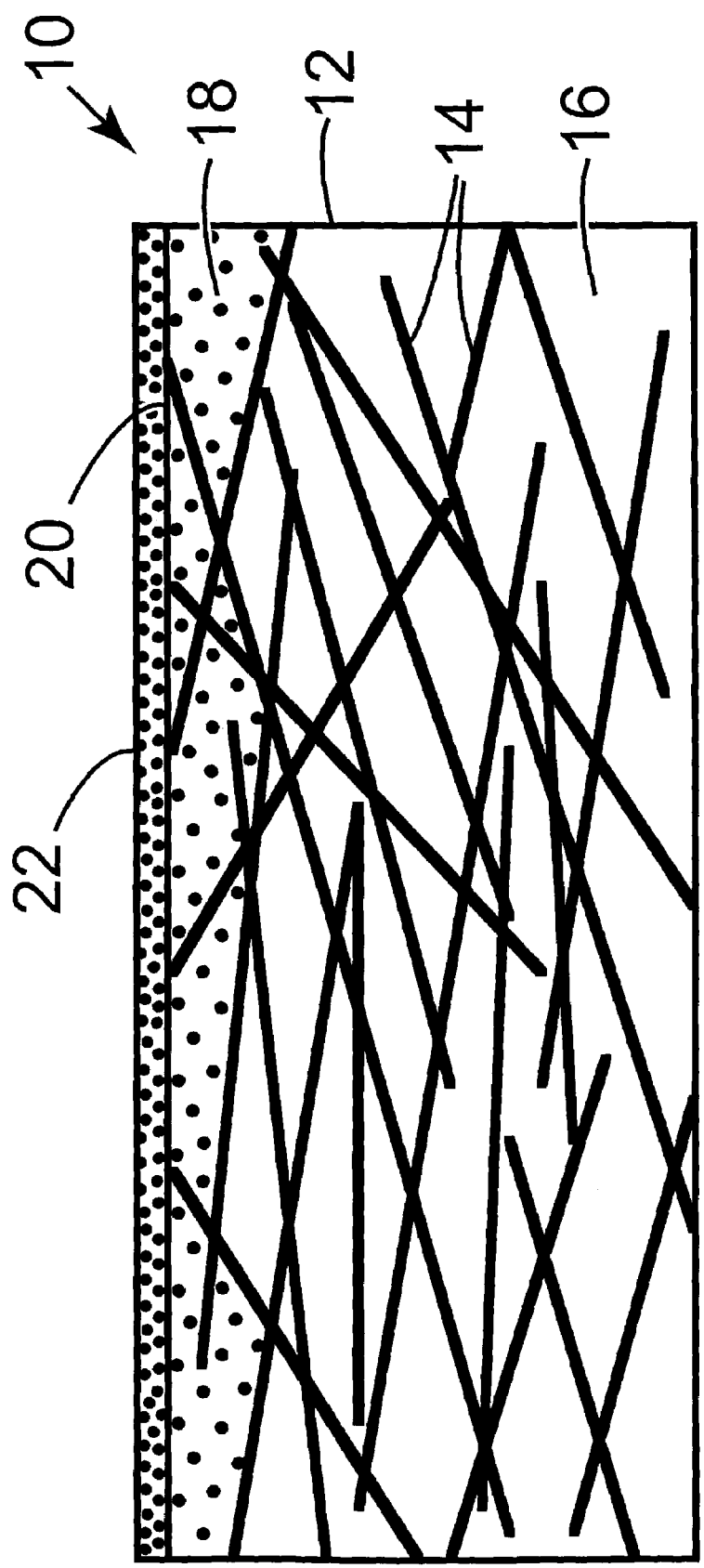
FIG. 1 is a not-to-scale schematic illustration of a filter made in accordance with the present invention.

For a better understanding of the present invention, together with other and further objects, advantages and capabilities thereof, reference is made to the following disclosure and appended claims in connection with the above-described drawings.

DETAILED DESCRIPTION OF THE INVENTION

Pierce does not contain teachings expressly related to the manufacture of a filter. However, the present invention improves upon Pierce by extending the teachings thereof to the area of filtration. It has been discovered that a uniform color of dry powder on a paper surface unexpectedly correlates well with desirable filtration characteristics. Therefore, rather than simply applying color, the present invention uses the basic method taught in Pierce to apply a functional material to the surface of the paper, which function is for filtration instead of for decoration. In the present invention, the aesthetic issue of dry powder "color" application to the surface of a paper "mat" surface is moot unless one wishes to color-code filters, for example, for various pore-sizes and/or constituent materials.

It has been discovered that the method taught by Pierce is suitable for manufacture of certain types of asymmetric filtration devices. A high permeability fibrous substrate provides mechanical support onto which is deposited, in the dry state, a lower permeability particulate layer that provides the particle-size-based "sorting" required to conduct filtration.

The substrate of the present invention corresponds generally to the paper "mat" of Pierce, and encompasses a broad range of organic and/or inorganic fibrous materials. The dry powder phase of the present invention corresponds generally to the "color" of Pierce, and encompasses a broad range of organic and/or inorganic particulate materials.

Substrate and powder phase selection are based on the requirements of a particular application, for example, chemical compatibility with materials being filtered, filtration process temperature, flow pressure, flow volume, pore size requirements, etc. Selection of particular materials for substrate and powder phase is not critical to the practice of the present invention. The method by which the filter is fabricated is a critical factor in the practice of the present invention. However, the artisan of ordinary skill will understand that care must be taken to select appropriate materials for substrate and dry powder phase in order to achieve desired results in a particular application.

The quantity of powder phase that can be carried by the substrate is a generally function of the physical characteristics of the substrate. Substrates may have various physical characteristics. For example, fibrous substrates may have uniform fiber sizes and/or aspect ratios, a plurality thereof, or random fiber sizes and/or aspect ratios. Moreover, size and distribution of fibers, and size and distribution of interstices thereof, can vary widely depending generally on factors such as diameter and length of the fibers, size distribution of the fibers, physical distribution of the fibers in space, and the density of the substrate. The substrate can hold more or less dry powder, depending on the size and amount of porosity of the substrate.

The dry powder phase is applied to the surface of the substrate by any conventional means. The powder can be poured onto the surface and spread evenly thereover with a brush, trowel, spatula, squeegee, or the like. The powder can also be brushed onto/into the substrate as taught in Pierce. Suitable applicators include a brush, such as a watercolor artist brush, a wad such as a cotton wad, a fiber pad, or any other type of applicator that minimally disturbs the substrate surface. The details of what kind of applicator one might choose depend on the specific substrate being coated, the dry powder phase being applied, and the particular type of coating one wishes to achieve. The skilled artisan will understand that selection of the particular applicator for a particular combination of substrate and dry powder phase can be determined by simple experimentation.

In the process of applying the dry powder to the substrate surface, it is important to fill the porous surface of the substrate with powder, generally without unduly compacting the powder therein, pushing the powder too far into the substrate pores, or damaging the substrate. In some applications, a degree of compaction may be desirable to obtain a specific porosity, depth of penetration into the substrate, and/or physical integrity. Compaction of the powder into the substrate pores generally tends to close porosity, and too much compaction could reduce porosity to a deleterious extent.

The evenness of color tone taught by Pierce corresponds generally to uniformity of the particle distribution in the filter of the present invention. The coating thus applied forms an excellent barrier layer at the surface of the carbon fiber paper. Pierce states, "paper can take and hold only so much of the dry colored material; as a result, the eventual evenness of the application is, in substance, built into the paper or board—an inherent quality of the surface."

Following application thereof, it may be advantageous or even necessary to remove excess dry powder phase by sweeping with a brush, trowel, or cloth, buffing, blowing excess away with pressurized fluid such as air, evacuation, or any other suitable conventional means for removing particulate matter from a surface. The substrate and dry powder coating are heated to a suitable temperature for a suitable time to bind the powder particles together and to the substrate.

At least one subsequent coating of dry powder phase can be added to the filter by the method described hereinabove. Such coatings can be of the same or different composition, and can be added prior to or subsequent to binding of the first coating. One or more additional coatings of gradually decreasing diameter particles may also be beneficial in some cases.

FIG. 1 is a not-to-scale schematic illustration of a filter 10 made in accordance with the present invention. The substrate 12 comprises fibers 14 with respective interstices (i.e., voids, pores) 16. The dry powder phase 18 penetrates the surface 20 of the substrate 12 and fills the interstices 16 at and/or near the surface 20. Optionally the filter 10 may further comprise at least one surface coating 22 of dry powder phase.

In one embodiment of the present invention, a substrate comprising carbon fiber paper is coated with a dry powder phase comprising finely divided titania. The pore structure of the carbon fiber paper substrate is generally considered too large to be useful as a micro-filter or ultra-filter. A dry powder phase is applied to at least one surface of the substrate to reduce the average pore size from the ~100 $\mu$m size of the carbon fiber paper substrate to the smaller size required for micro-filtration or ultra-filtration. The large pore volume at and/or near of the substrate is thus filled in and bridged by the dry powder phase.

The first-applied dry powder phase can serve as a transition layer and comprises, for example, a mixture of 50–90 wt % of 0.25 $\mu$m (size) titania particles and 5–50 wt % of 0.05 $\mu$m titania particles. After application, the dry powder phase is heated to a temperature in the range of about 300–500° C. to bind the particles together and to the fibers of the paper.

Subsequently, one or more additional coatings can optionally be applied and bound in similar fashion as described hereinabove. A surface coating may primarily comprise 0.05 $\mu$m titania particles, with a smaller percentage (generally 0.1–30 wt %) of 0.25 $\mu$m particles to control sintering behavior. After application thereof, the filter is again heated as described hereinabove bind the surface coating together and to the material below.

Various other embodiments of the present invention are envisioned. Various fibrous substrates comprising, for example, carbon, silica, alumina, zirconia, asbestos, glass, alumino-silicates, metal and alloy "wool" may be combined with various other dry powder phase materials such as silicon carbide, titanium carbide, titanium nitride, silicon nitride, and/or other refractory oxides, carbides, nitrides, borides, silicides, and precursors thereto.

Precursors can be used as the dry powder phase. After dry application, and upon heating in an appropriate atmosphere, precursors convert to the desired "filler" material for the filter, and are bound to the substrate as formed.

For example, phenolic powder is a precursor to carbon. Dry phenolic powder can be applied to a substrate in accordance with the present invention. Upon heating to a suitable temperature, the phenolic powder decomposes and converts to carbon.

Other precursors, for example, include carbonate, sulfate, oxalate compounds, etc, which convert to oxides by thermal decomposition.

Moreover, reducible oxides are suitable precursors to metal powder "filler" phases. NiO, for, example, will reduce to nickel metal, $Fe_2O_3$ will reduce to iron metal, and $Cu_2O$ will reduce to copper metal.

Moreover, metal powders can be used as precursors for carbides and nitrides. For example, Ti, Zr, Hf, Ta, V, and W form TiN, ZrN, HfN, TaN, VN, and WN when heated in nitrogen, and will form TiC, ZrC, HfC, TaC, VC, and WC when heated in a carbonaceous atmosphere such as methane, propane, acetylene, etc.

Some dry powder phases, for example, SiC and $Si_3N_4$ do not generally densify during thermal processing unless sintering additives are included. Therefore, there is little or no shrinkage of the dry powder phase during thermal processing minimizing or eliminating cracking of the filter.

In the Examples given below, the technique similar to that taught by Pierce is used. A dry brush is used to pick up dry powder and then apply it to the surface of the paper. This technique is simple and effective and deposits only a limited amount of powder onto the surface of the paper as a coating. A wax organic binder was used to help bind the dry powder particles together and to help in the flow of the particles during the coating process. The use of a binder is a useful, but not a necessary, additional step in the process. Dry powder phase containing no additives can be successfully coated onto the carbon paper in accordance with the present invention.

EXAMPLE I

A carbon paper disc substrate having a structure such as that shown in FIG. 1 was dry brush coated with a mixture of 70 wt % 0.25 $\mu$m titania and 30 wt % 0.05 $\mu$m titania having 20 wt % steramide binder added. The coated substrate was heated at 400° C. in air for 1 hour. The resulting article was a useful filter.

EXAMPLE II

A carbon paper disc substrate was dry brush coated with a mixture of 90 wt % 0.05 $\mu$m titania and 10 wt % 0.25 $\mu$m titania having 20 wt % steramide binder added. The coated substrate was heated at 400° C. in air for 1 hour. The resulting article was a useful filter.

EXAMPLE III

A carbon paper disc substrate was dry brush coated with a first layer comprising a mixture of 30 wt % 0.05 μm titania and 70 wt % 0.25 μ/m titania having 20 wt % steramide binder added. The coated substrate was heated at 400° C. in air for 1 hour.

The once-coated substrate was further dry brush coated with a second layer comprising a mixture of 90 wt % 0.05 μm titania and 10 wt % 0.25 μm titania having 20 wt % steramide binder added, The coated substrate was heated at 400° C. in air for 1 hour.

The twice-coated substrate was further dry brush coated with a third layer comprising a mixture of 90 wt % 0.05 μm titania and 10 wt % 0.25 μm titania having 20 wt % steramide binder added. The coated substrate was heated at 400° C. in air for 1 hour. The resulting article was a useful filter. FIG. 3 is a photomicrograph of the filter at 85× magnification.

Filters made in accordance with the above three examples were tested for particle penetration. Tests conducted according to ASTM D2986-95A, using a Percent Penetration Meter, Air Techniques International, 11403 Cronridge Drive, Owings Mills, Md. 21117-2247.

The results of penetration tests of the three filters are given in Table I. All three filters were effective in blocking the test particles, which comprised 0.3 micrometer diameter poly-alphaolefin (PAO) droplets, in accordance with ASTM D2986-95A. The filter from Example 3 performed so well, it is designated as an "absolute" filter, since penetration therethrough was below the 0.03% level used to define "absolute" filter efficiency.

TABLE I

| Example | Coating Composition | % Penetration |
| --- | --- | --- |
| I | 30/70/20/L | 0.6 |
| II | 90/10/20/L | 0.1 |
| III | 30/70/20/L | 0.02 |
|  | 90/10/20/L |  |
|  | 90/10/20/L |  |

Figure 2:
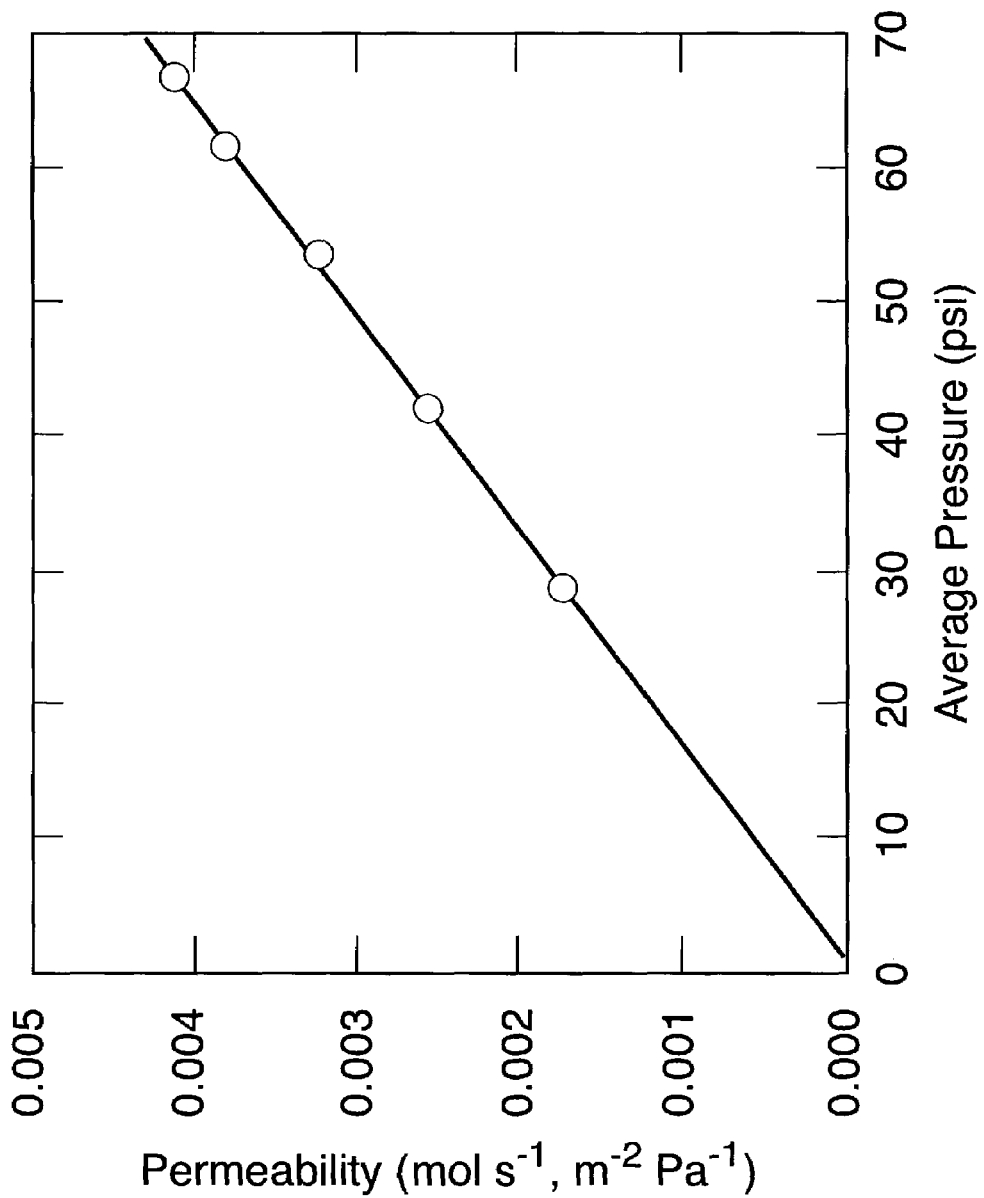
FIG. 2 is a graph showing data from a permeability test of a filter made in accordance with the present invention.

A filter made in accordance with Example III was tested for permeability at various pressures using nitrogen as a test gas. FIG. 2 shows that the flow therethrough through is totally Poiseuille, with no Knudsen (diffusional) flow component. The flow in the filters made in Examples I and II are deemed also to be Poiseuille, since the pore sizes in those filters are either the same size or larger than the pore size of the coating in Example III.

Figure 3A:
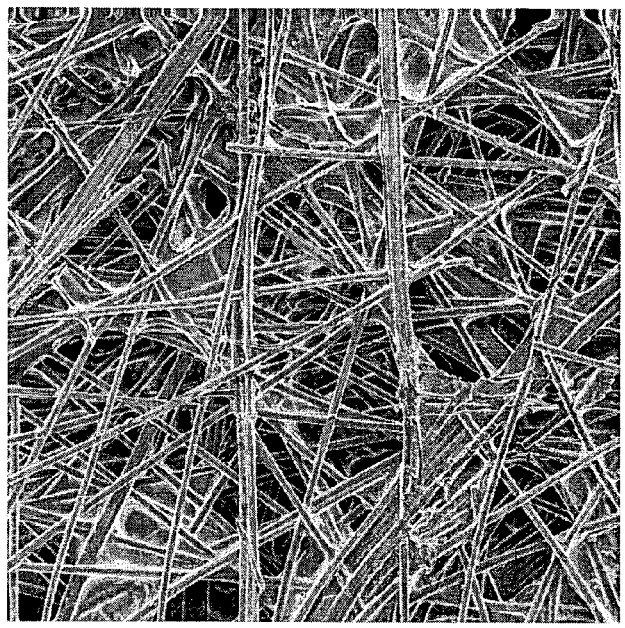
FIG. 3a is a photomicrograph (85× magnification) of an uncoated carbon fiber paper substrate.

FIG. 3a shows the highly porous nature of the starting carbon fiber paper. The uncoated paper is extremely porous with pores as large as 100 μm.

Figure 3B:
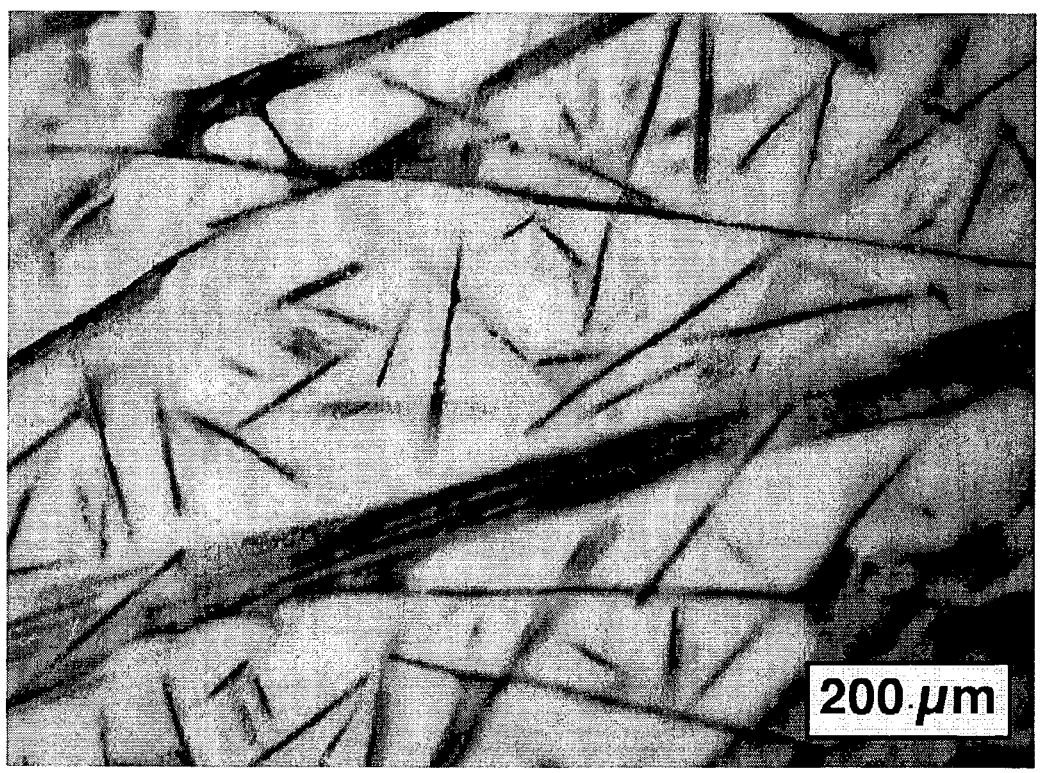
FIG. 3b is a photomicrograph (85× magnification) of a filter made in accordance with the present invention.

FIG. 3b shows the excellent filtration surface provided by the $TiO_2$ after coating (Example III). The coated paper has the surface pores filled in with $TiO_2$ and provides an excellent filtering surface having much smaller pores.

Figure 4:
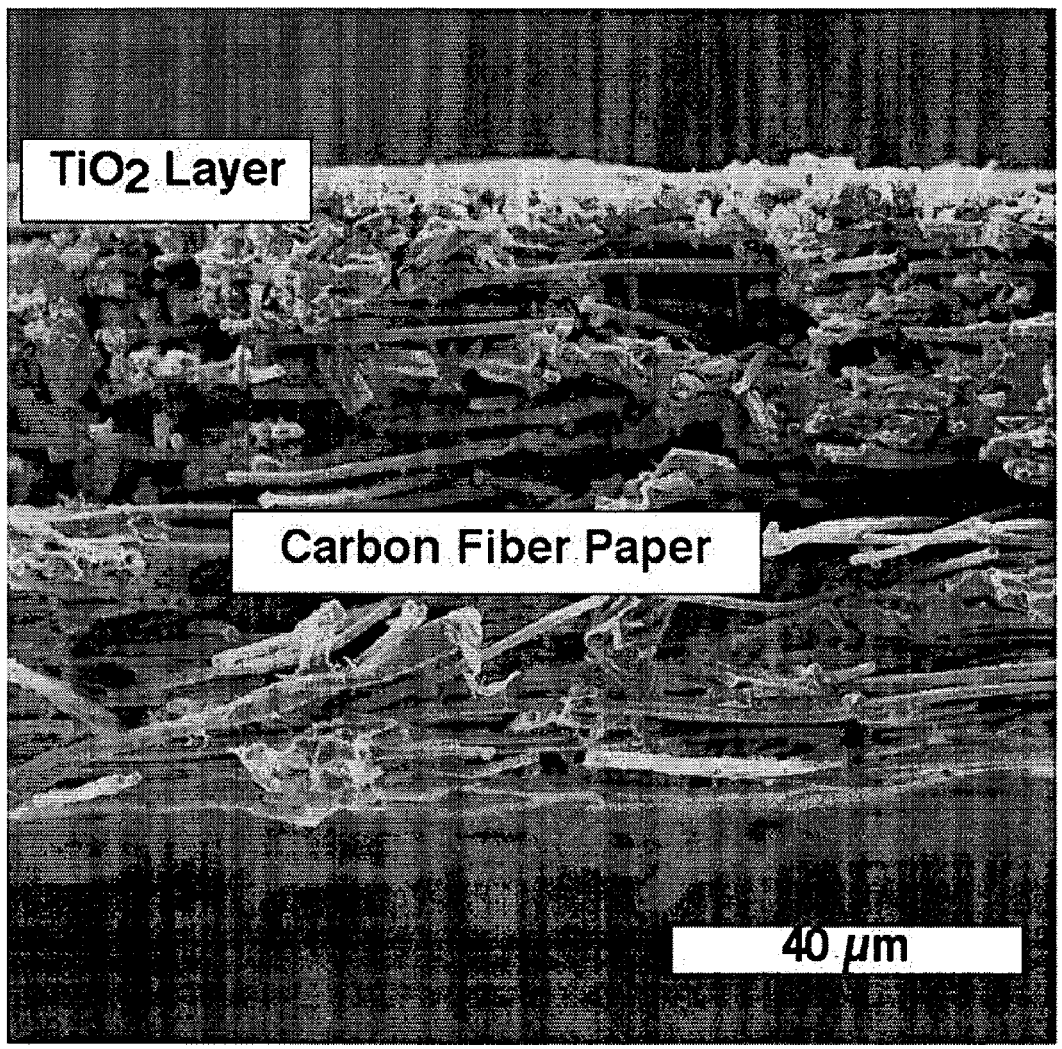
FIG. 4 is a photomicrograph (100× magnification) of a fractured cross-sectional surface of a filter made in accordance with the present invention.

FIG. 4 shows that the coating applied to the carbon fiber paper remains at the surface of the paper and does not penetrate into the bulk of the paper (Example I).

The method of the present invention can be used to make "absolute" filters for gas filtration. The method of the present invention is a simple, dry process and requires no solvents during the coating process. Filters made by the method of the present invention can be used for high temperature situations (above 400° C.) or for highly corrosive environments. Filters for corrosive gases such as those used in semiconductor manufacture, and filters for high temperature gases can be made using the method of the present invention.

SiC or TiC as the powder on graphite or SiC substrate can be used for gas filtration at temperatures ranging up to 1200° C., and even up to 1600° C. in a non-oxidizing atmosphere. Titania or TiN as the powder on graphite substrate can be used for filtration of highly corrosive liquids.

An example of metal and alloy wools is the well-known steel wool. Metal and alloy wools, and any other material that can be made into fine wires or fibers and formed into a matted mass can serve as a substrate for making a filter in accordance with the present invention.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of making a filter comprising the steps of:
   a. providing a fibrous substrate having a porous surface
   b. applying to said porous surface a first coating of dry powder comprising particles onto said porous surface to form a filter preform;
   c. heating said filter preform to bind said substrate and said particles together to form a filter,
   d. applying to said filter at least one additional coating of dry powder comprising particles to form a multi-layer filter preform; and
   e. heating said multi-layer filter preform to bind said additional coating to said filter.

2. A method in accordance with claim 1 wherein said filter comprises an essentially uncoated subsurface region of said fibrous substrate, a coated transition region of said fibrous substrate having particles bound thereto, and a top coat comprising particles.

3. A method in accordance with claim 1 wherein said first coating and said additional coating comprises identical particles.

4. A method in accordance with claim 1 wherein said first coating comprises larger particles than the particles that comprise said additional coating.

5. A method in accordance with claim 1 wherein said first coating comprises particles of a different composition from the particles that comprise said additional coating.

* * * * *